June 27, 1967   N. H. LOVENDAHL   3,327,572
TOOL HOLDER

Filed Nov. 17, 1965   2 Sheets-Sheet 1

INVENTOR
N. H. LOVENDAHL
BY
ATTORNEY

June 27, 1967  N. H. LOVENDAHL  3,327,572
TOOL HOLDER

Filed Nov. 17, 1965  2 Sheets-Sheet 2

United States Patent Office 3,327,572
Patented June 27, 1967

3,327,572
TOOL HOLDER
Norman Herbert Lovendahl, Elmwood Park, Ill., assignor to Futurmill, Inc., Farmington, Mich., a corporation of Michigan
Filed Nov. 17, 1965, Ser. No. 508,353
12 Claims. (Cl. 77—58)

ABSTRACT OF THE DISCLOSURE

An adjustable tool holder comprising first and second sections selectively movably adjustable relative to each other and respectively carrying cutting means, and wall means on each of the sections cooperating to define a locating means always disposed substantially centrally between the cutting means in any selected adjusted position of the sections of the tool holder. The tool holder is adapted to be supported on a mounting member, such as a boring bar, by means of a mounting screw which seats against the aforementioned locating means, the mounting screw being disposed in a plane containing the axis of the mounting member so that the cutting means are always automatically disposed substantially equal distances from the axis of the mounting member.

---

This invention relates generally to tool holders for use with machine tools and more particularly, concerns adjustable tool holders for use with boring bars.

One of the problems encountered in boring operations is the inherent necessity of repeatedly adjusting the radius of cut. This is most often accomplished by moving the cutting bit of the tool with respect to its axis of rotation. When the cutting bit is moved by loosening its clamping screw and readjusting its position, the readjusting process is time consuming or inaccurate.

To overcome the problem of inordinately long adjustment time and to improve the precision of the adjustment, more sophisticated adjusting arrangements have been used. Where block type cutters have been used, the more sophisticated adjusting arrangements known in the art have created such problems as adversely effecting the strength of the boring bar, severely limiting the range of adjustment, or limiting the number of cutting edges provided.

Accordingly, it is an object of the present invention to provide new and novel adjustable block type tool holders for use in boring bars.

A more particular object of the invention is to provide an adjustable block type tool holder presenting at least two cutting surfaces to the work piece, wherein the adjustment operates to move all cutting surfaces an equal radial distance.

A related object of the invention is to provide means for micro adjusting the radial movement of the cutting edges.

A further object of the invention is to provide anti-backlash clamping means as an integral part of the adjustable tool holders.

A still further object of the invention is to provide an adjustable boring block tool holder and locating pin assembly wherein the tool holder is easily and precisely centrally located in the boring bar.

In accordance with one non-limiting embodiment of the invention an adjustable tool holder arrangement for use in boring bars is provided wherein the tool holder is comprised of two cooperating sections. For practical economical reasons the two sections can be identical. Each section has a base portion. One side of the base has a tongue protruding therefrom while the opposite side of the base is grooved to receive the tongue. Each section is provided with cutting insert holding means.

Two sections are assembled to form a tool holder. The tongue of one section rides in the groove of the other section. Threaded screw means are provided for adjusting the length of the assembled tool holder and screw clamping means are provided for locking the length as adjusted.

The assembled tool holder fits into a slot in a boring bar. Tapered locating screw means are provided to ascertain that the cutting edges of the inserts are symmetrical with respect to the axis of the boring bar regardless of the adjustment of boring tool holder.

Thus, an adjustable boring tool holder is provided that is amenable to precise and symmetrical adjustment while in the boring bar. Further, the adjusted length is adequately secured against backlash or inadvertent slippage during the boring operation.

The foregoing and other objects and advantages of this invention and the manner of obtaining them will become more apparent and the invention itself will be best understood by reference to the following description of the embodiment of the invention taken in conjunction with the accompanying drawings wherein.

In the drawings and in the description that follows the same numerical designations are used to identify the same parts shown in the different views.

Figure 1:
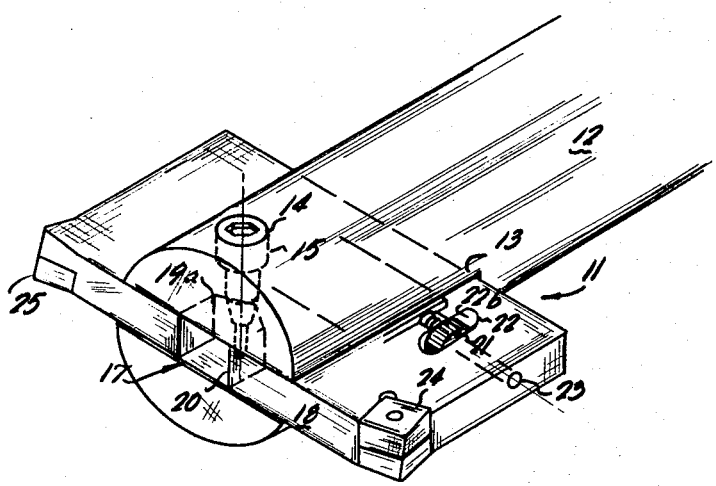
FIG. 1 is a representation of the adjustable boring tool holder assembled in a boring bar.

FIG. 1 shows the adjustable boring tool holder 11 assembled into a boring bar 12. A slot 13 is shown in the end of the bar for receiving the tool holder. It should be understood that while the slot is here shown at the end of the bar, for convenience, it could just as well be located anywhere along the length of the bar as required by the particular tool machine and work piece combination.

The tool holder 11 and consequently, the slot 13 are relatively narrow. Thus, the boring bar is not materially weakened by the slot 13.

A tapered locating screw 14 is shown assembled into a threaded hole 16 located a certain distance behind the front end of the slot. The axis of the screw 14 coincides with a diameter of the boring bar.

As can be seen in the dotted line portion of FIG. 1, the tool holder assembled has a locating groove or slot 17 in its leading edge 18. The groove has parallel walls 19, 20. The parallel walls blend into converging walls 19a, 20a forming equilateral triangular section. The converging walls are designed to cooperate with the tapered locating screw to center the tool holder on the axis of the boring bar. When the taper screw 14 is tightened down in hole 16 the tapered portion of the screw presses against converging walls 19a, 20a to center the tool holder.

Means such as size-adjustment screw 21 are provided for varying the radius of the cut made when the boring bar rotates relative to the work piece. The head of the size adjustment screw sets in a section of the tool holder that is machined to provide a groove 22 for receiving the adjusting screw.

The groove 22 is dimensioned to be large enough to enable the screw to turn easily and to be small enough so that there is an insignificant change of the tool holder dimensions when the screw changes from being turned clockwise to counter-clockwise or vice-versa. The reason for the difference in tool holder dimension when the direction of rotations of the screw is changed is that when the screw is turned clockwise it bears against the outside wall 22a of groove 22 whereas when the screw is turned counter-clockwise it bears against the outside wall 22b of groove 22.

Means, such as aperture 23, are provided for accessing the adjusting screw to assure its availability to be turned while the tool holder is mounted in the boring bar. The aperture means, it should be understood, represent a preferred means for enabling the actuation of the adjusting screw. The adjusting screw 21 is preferably an Allen head machine screw. Thus, it is most effectively turned by using an appropriate Allen wrench inserted in the aperture 23. The outside of the aperture 23 could be marked with lines to indicate angular displacement.

Alternatively, the screw 21 could have a knurled, geared or starred head to enable its rotational actuation without having to use aperture 23. An advantage in the arrangement illustrated is that no portion of the adjusting screw protrudes above the tool holder. Thus, there are no unnecessary piece part chip obstructions. Such obstructions would tend to accumulate chips at the point of actuation of the adjusting screws with the probability of jamming the adjusting screw.

A plurality of cutting means are provided, such as cutting inserts 24, 25. A readily adjustable tool holder is especially advantageous for use when the cutting tools are of the throw away insert variety. The length of the tool holder is easily adjusted to correct for the differences in tool insert size when replacing the insert. Thus, new inserts can be placed in the holder and the length of the holder being preadjusted. Thus, there is no necessity for making time consuming readjustment with the holder in the boring bar.

Figure 2:
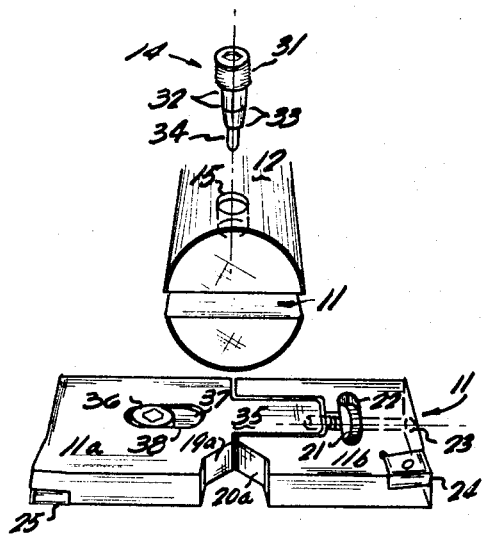
FIG. 2 is a front perspective view of the assembly of FIG. 1 with the tool holder removed from the bar.

FIG. 2 is a partially exploded front view showing the taper screw 14, the tool holder 11 and the boring bar 12 as separate items.

The tapered locating screw 14 is shown as an Allen headed screw having a threaded head 31 followed by a cylindrical section 32, a conical tapering section 33 and a pin-like section 34. The screw shown by way of example is the familiar taper lock screw well known to those skilled in the art.

The threaded hole 15 in the boring bar is threaded to receive the tapered locating screw 14. The dimensions of the screw and bar combination are such that the tapered portion of the screw extends into the slot 17 to bear against the converging walls 19a, 20a of the tool holder, thus automatically centering the tool holder.

The tool holder 11 is comprised of two sections 11a, 11b. The section 11b has the groove 22 for receiving adjusting screw 21. The screw thread portion of screw 21 is shown threaded into a threaded hole in the tongue 35 of section 11a.

Means, such as locking screw 36, is shown in slot 37 of section 11a. The screw 36 extends through section 11a and threads into a threaded hole in the tongue of section 11b. The head of screw 36 bears against a shoulder 38 on the walls of groove 37. Thus, when screw 36 is tightened it clamps sections 11a, 11b together. Both sections 11a, 11b are identical, hence, another clamping screw is located in a groove in section 11b and functions as does screw 36 to clamp the tool holder assembly together in the position determined by adjusting screw 21. In preferred embodiments of the invention, the clamping screws are Allen head type machine screws. The clamping provided by screws, such as screw 36, precludes any adverse backlash effects which could otherwise be caused by thread differences.

FIG. 2 also shows cutting inserts 24, 25 mounted on the tool holder. The inserts can be mounted in any way familiar to those skilled in the art with no material effect on the invention disclosed herein.

Aperture 23 is also shown in FIG. 2. Since FIG. 2 clearly shows the tongue and groove arrangement of the tool holder, it is clear that actuation of screw 21, is by means such as an Allen wrench inserted in aperture 23, causing relative lengthwise motion of the two sections 11a, 11b. When screw 21 is threaded into the threaded hole of tongue 35, section 11a is pulled toward section 11b to shorten the overall length of the tool holder. Similarly, when screw 21 is threaded out of the threaded hole in tongue 35, section 11a is pushed away from section 11b to lengthen the tool holder and thereby increase the cutting radius.

Figure 3:
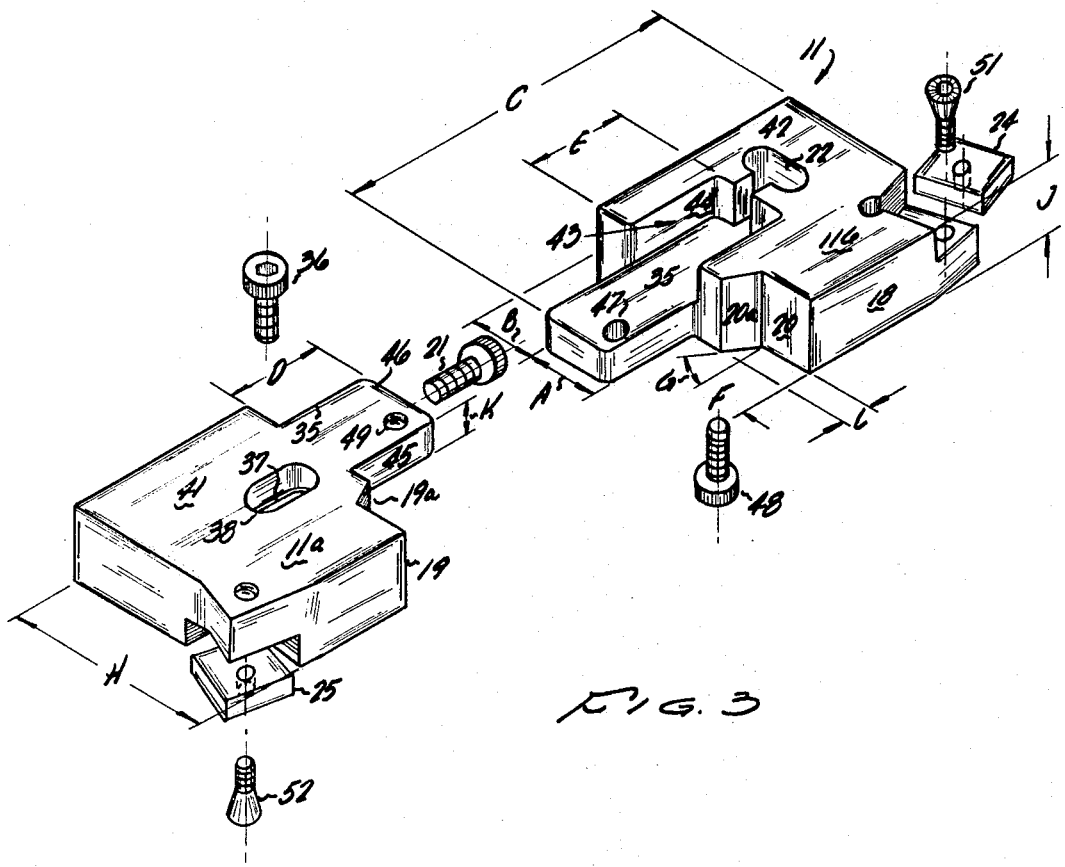
FIG. 3 is an exploded view of the adjustable tool holder.

FIG. 3 pictorially shows an exploded view of tool holder 11. Therein the two sections 11a, 11b are separated. Each section has a base portion such as portions 41, 42. A tongue 35, 35a extends from one side of each portion respectively. Section 11a is shown with its tongue 35 on the top side. Each section 11a, 11b has a groove, such as groove 43, designed to receive a tongue whereby the walls of the groove 43, such as walls 44, contiguously encircle the walls, such as wall 45, of tongue 35.

A compartment or groove 22 is machined into the groove side of each section. Groove 22 serves to receive adjusting screw 21. When the holder is assembled, the adjusting screw fits into a threaded hole that runs transversely through the tongue 35. This threaded hole is indicated in FIG. 3 by center line 46.

It should be noted that section 11b, although shown without a transverse threaded aperture, could have such a hole. Similarly, section 11a could have grooves, such as grooves 43 and 22, machined in it. In fact, in certain embodiments, sections 11a and 11b are identical.

Sections 11a, 11b are shown as having means therein for clamping the two sections together in the position determined by the adjust screw 21. More particularly, locking screw 36 is shown above slot 37. Screw 37 is kept from passing completely through slot 37 by a shoulder 38 in the walls of the slot. When the tool holder is assembled, screw 36 is threaded into threaded aperture located in tongue 35a.

A slot similar to slot 37 is located in the base portion 42 of section 11b. A locking screw 48 is used in this slot in the same manner as screw 36 is used. Screw 48 is threaded into threaded aperture 49 on tongue 35 when the tool holder is assembled. Thus, the assembled tool holder can use two clamping screws to prevent unwarranted movement of its sections during use.

The exploded view shows cutting inserts 24, 25 and the beds on which they are mounted in the front face 18 of the tool holder. Clamping screws 51, 52 are shown as one means for securing the inserts 24, 25 respectively.

The bases 41, 42 are machined so that when assembled a slot 17 will be present in the front face 18 of the tool holder. It should be understood that if slot 13 is not at the end of the boring bar, then the slot 17 could be positioned elsewhere on the tool holder other than on the front face 18. The walls 19, 20 of the two sections are substantially parallel. The walls 19a and 20a are equilateral and tend to converge at a vertex. Thus, the walls 19a, 20a form receiving bearing surfaces for tapered section 33 of taper screw 14.

One preferred embodiment of the inventive adjustable tool holder disclosed herein has the following dimensions:

$A = 1\frac{3}{16}$ inches  
$B = \frac{5}{16}$ inch  
$C = 4\frac{7}{8}$ inches  
$D = 2$ inches  
$E = 2\frac{1}{64}$ inches  
$F = \frac{9}{16}$ inch  
$G = 30°$  
$H = 2.485$ inches  
$J = .737$ inch  
$K = .368$ inch  
$L = .265$ inch In use the adjustable boring block tool holder 11 is placed in slot 17 in a boring bar 12. Prior thereto, the locking screws 36 and 48 are loosened. The size adjusting screw 21 is turned to either lengthen or shorten the tool holder to the desired length. The locking screws 36, 48 are tightened clamping the holder sections together to retain the dimension as set. The taper locating screw is then tightened to symmetrically locate the cutting edges of inserts 24, 25 relative to the turning axis of boring bar 12. The tapered portion 33 of screw 14 bears against surfaces 19a and 20a centrally locating the holder and clamping it against the rear wall of slot 17. Any time an adjustment has to be made the above procedure is followed. The tool holder adjustment could be accomplished while in the boring bar if the locking screws were kept loose enough to enable movement of the sections responsive to the rotation of the size adjustment screw but tight enough to prevent any unwarranted movement of the sections. However, adjustment of the tool holder while it is positioned in the bar is not necessary. One of the advantages of the inventive tool holder is that it can be adjusted while outside of the bar and be automatically, symmetrically located within the bar.

Thus, according to the invention a readily adjustable tool holder is provided that has a relatively large range of adjustment, which adjustment is precise and easily accomplished with backlash being substantially eliminated. Further, the tool holder clamping screw also serves to ascertain that regardless of adjustment the multiple cutting edges provided will remain symmetrical relative to axis of rotation.

While the above principles and advantages of the invention have been described in connection with specific arrangements and apparatus, it is to be clearly understood that this description is made only by way of example and not as a limitation on the scope of the invention.

I claim:

1. An adjustable tool holder comprising first and second sections selectively movably adjustable relative to each other, cutting means respectively carried by and movable with said sections as the latter are adjusted relative to each other, locking means for locking said sections together in any selected adjusted position thereof to lock said cutting means a predetermined fixed distance from each other, and first and second walls means respectively carried by and movable with said first and second sections as the latter are adjusted relative to each other, said first and second wall means coacting to define locating means for said tool holder substantially centrally located between said cutting means in any selected adjusted position of said sections.

2. The invention as defined in claim 2 wherein said first and second wall means respectively converge toward each other.

3. In an adjustable tool holder of the type comprising first and second sections selectively movably adjustable relative to each other, cutting means respectively carried by and movable with said sections as the latter are adjusted relative to each other, and locking means for locking said sections together in any selected adjusted position thereof to lock said cutting means a predetermined fixed distance from each other, said tool holder being adapted to be supported on a mounting member comprising mounting means engageable with said tool holder; the improvement comprising first and second wall means respectively carried by and movable with said first and second sections as the latter are adjusted relative to each other, said first and second wall means coacting to define locating means for said tool holder substantially centrally located between said cutting means in any selected adjusted position of said sections, said mounting means being movable into engagement with said locating means to support said tool holder on said mounting member.

4. The invention as defined in claim 3 wherein said first and second wall means respectively converge toward each other, and said mounting means comprises a mounting screw threadably engaged with said mounting member and including a tapered portion engageable with said first and second wall means respectively.

5. The invention as defined in claim 3 wherein said mounting member includes a slot extending substantially normal to the axis of said mounting member and adapted to receive said tool holder, said mounting means being movable in a plane containing said axis and disposed substantially normal to said slot to locate said cutting means substantially equidistantly from said axis of said mounting member.

6. In an adjustable tool holder of the type comprising first and second sections selectively movably adjustable relative to each other, cutting means respectively carried by and movable with said sections as the latter are adjusted relative to each other to selectively vary the distance between said cutting means, and locking means for locking said sections together in any selected adjusted position thereof to lock said cutting means a predetermined fixed distance from each other, said tool holder being adapted to be supported on a mounting member having a longitudinally extending axis and including mounting means carried by said mounting member for movement in a plane containing said axis for engagement with said tool holder; the improvement comprising first and second wall means respectively carried by and movable with said first and second sections as the latter are adjusted relative to each other, said first and second wall means coacting to define locating means for said tool holder substantially centrally located between said cutting means in any selected adjusted position of said sections, said mounting means being movable into engagement with said locating means to automatically locate said cutting means substantially equidistantly from said axis of said mounting member in any selected adjusted position of said sections of said tool holder.

7. The invention as defined in claim 6 wherein said mounting member includes a slot extending substantially normal to said axis of said mounting member and adapted to receive said tool holder, and the plane of movement of said mounting means being disposed substantially normal to said slot.

8. The invention as defined in claim 6 wherein said mounting member comprises a slot extending substantially normal to said axis of said mounting member, said slot including a base portion, said respective sections of said tool holder including portions thereof seatable against said base portion, and wherein said locating means is disposed remote from said portions of said sections seatable against said base portion of said slot whereby said mounting means coacts with said locating means to clamp said tool holder against said base portion of said slot.

9. The invention as defined in claim 8 wherein said first and second wall means respectively converge toward each other, and said mounting means comprises a mounting screw threadably engaged with said mounting member and including a tapered portion engageable with said first and second wall means respectively.

10. A cutting tool comprising, in combination, an adjustable tool holder including first and second sections selectively movably adjustable relative to each other, cutting means respectively carried by and movable with said sections as the latter are adjusted relative to each other to selectively vary the distance between said cutting means, locking means for locking said sections together in any selected adjusted position thereof to lock said cutting means a predetermined fixed distance from each other, first and second wall means respectively carried by and movable with said first and second sections of said tool holder as said sections are adjusted relative to each other, said first and second wall means coacting to define locating means for said tool holder substantially centrally located between said cutting means in any selected adjusted position of said sections; a mounting member having a longitudinally extending axis, a mounting slot extending through said mounting member substantially normal to said axis, and mounting means carried by said mounting member for movement in a plane containing said axis and substantially normal to said slot, said tool holder being mounted within said slot and said mounting means being removably engageable with said locating means to automatically locate said cutting means substantially equidistantly from said axis of said mounting member in any selected adjusted position of said sections of said tool holder.

11. The invention as defined in claim 10 wherein said slot includes a base portion, said respective sections of said tool holder including portions thereof seatable against said base portion, and wherein said locating means is disposed remote from said portions of said sections seatable against said base portion of said slot whereby said mounting means coacts with said locating means to clamp said tool holder against said base portion of said slot.

12. The invention as defined in claim 11 wherein said first and second wall means respectively converge toward each other, and said mounting means comprises a mounting screw threadably engaged with said mounting member and including a tapered portion engageable with said first and second wall means respectively.

References Cited

UNITED STATES PATENTS

| | | |
|---|---|---|
| 1,853,971 | 4/1932 | Giern. |
| 2,742,800 | 4/1956 | Miller. |
| 2,878,695 | 3/1959 | Busch. |
| 3,124,980 | 3/1964 | Gill et al. |

WILLIAM W. DYER, Jr., *Primary Examiner.*

G. A. DOST, *Assistant Examiner.*

UNITED STATES PATENT OFFICE
CERTIFICATE OF CORRECTION

Patent No. 3,327,572                                    June 27, 1967

Norman Herbert Lovendahl

It is hereby certified that error appears in the above numbered patent requiring correction and that the said Letters Patent should read as corrected below.

Column 2, line 70, for "outside" read -- inside --; column 5, line 41, for the claim reference numeral "2" read -- 1 --.

Signed and sealed this 16th day of July 1968.

(SEAL)
Attest:

Edward M. Fletcher, Jr.                              EDWARD J. BRENNER

Attesting Officer                                           Commissioner of Patents